United States Patent
Sterzing et al.

(10) Patent No.: US 12,247,500 B2
(45) Date of Patent: Mar. 11, 2025

(54) METHOD AND DEVICE FOR THE COMPUTER-AIDED OPEN-LOOP AND/OR CLOSED-LOOP CONTROL OF AN ENERGY GENERATION SYSTEM, AND COMBINED POWER PLANT

(71) Applicant: Siemens Energy Global GmbH & Co. KG, Munich (DE)

(72) Inventors: Volkmar Sterzing, Neubiberg (DE); Holger Schöner, Munich (DE); Nico Lehmann, Falkensee (DE); Ambrosius Ruch, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 18/551,636

(22) PCT Filed: Mar. 22, 2022

(86) PCT No.: PCT/EP2022/057506
§ 371 (c)(1),
(2) Date: Sep. 21, 2023

(87) PCT Pub. No.: WO2022/207412
PCT Pub. Date: Oct. 6, 2022

(65) Prior Publication Data
US 2024/0167397 A1   May 23, 2024

(30) Foreign Application Priority Data
Mar. 30, 2021 (EP) ..................... 21165886

(51) Int. Cl.
*F01K 23/10* (2006.01)
*G06N 20/00* (2019.01)

(52) U.S. Cl.
CPC ............ *F01K 23/101* (2013.01); *G06N 20/00* (2019.01)

(58) Field of Classification Search
CPC ....... F01K 23/101; F01K 13/02; G06N 20/00; F02C 9/00; F05D 2270/709; F05D 2270/71
See application file for complete search history.

(56) References Cited

U.S. PATENT DOCUMENTS 5,485,545 A * 1/1996 Kojima ................. H02J 3/18
706/23
2007/0240648 A1 10/2007 Badami et al.
(Continued)

FOREIGN PATENT DOCUMENTS

DE 102007061604 A1 6/2009
EP 2657468 A2 10/2013
(Continued)

*Primary Examiner* — Jason H Duger

(57) ABSTRACT

A method is provided for the computer-aided open-loop and/or closed-loop control of the operation of an energy generation system. The method may include: creating a simulation model of the energy generation system; providing an efficiency calculation module that is designed to calculate the expected thermal and electrical efficiency of the energy generation system based on the created simulation model and using predefined operating parameters; applying a learning and/or optimization method to the provided efficiency calculation module using previously obtained known operating data of the energy generation system and/or based on simulation data obtained by the simulation model such that the operation of the energy generation system is optimized in terms of at least one thermal and/or electrical operating parameter in line with a target specification; creating a control strategy for the energy generation system on the basis of the trained efficiency
(Continued)

calculation module; and operating the energy generation system using the created control strategy.

14 Claims, 3 Drawing Sheets

(56) References Cited

U.S. PATENT DOCUMENTS

| | | | |
|---|---|---|---|
| 2009/0043406 A1* | 2/2009 | Gauder | G05B 23/0294 |
| | | | 700/30 |
| 2013/0073098 A1* | 3/2013 | Gan | H02J 3/32 |
| | | | 700/286 |
| 2014/0060066 A1 | 3/2014 | Hesse | |
| 2015/0184549 A1 | 7/2015 | Pamujula et al. | |
| 2015/0227121 A1* | 8/2015 | Dull | G06N 7/00 |
| | | | 700/287 |
| 2016/0040602 A1* | 2/2016 | Brummel | G05B 13/027 |
| | | | 700/287 |
| 2016/0208711 A1 | 7/2016 | Düll et al. | |

FOREIGN PATENT DOCUMENTS

| | | |
|---|---|---|
| EP | 3022611 B1 | 8/2014 |
| EP | 2910743 A1 | 8/2015 |
| WO | 2006079483 A1 | 8/2008 |
| WO | 2012072352 A1 | 6/2012 |

\* cited by examiner

METHOD AND DEVICE FOR THE COMPUTER-AIDED OPEN-LOOP AND/OR CLOSED-LOOP CONTROL OF AN ENERGY GENERATION SYSTEM, AND COMBINED POWER PLANT

The present invention relates to a method and a device for the computer-aided open-loop and/or closed-loop control of the operation of an energy generation system, and to a combined power plant.

A combined power plant is generally understood to mean a power plant or a virtual power plant which combines different processes from energy sources with one another, for example a combination of a Joule cycle process or Brayton cycle process with a Clausius-Rankine cycle process in a gas and steam turbine power plant. Examples of such combined power plants are the generally known gas and steam turbine power plant or a power plant with combined heat and power generation in which, in addition to generating electricity, use is also made of a residual energy which results from the process of current generation. These are referred to as a combined cycle power plant (CCPP) or a combined cycle gas turbine (CCGT).

One specific application of a combined power plant is employed in the context of seawater desalination plants. Such plants generally use a combined power plant in the form of a gas and steam turbine power plant in which the heat from the current generation is used to desalinate seawater, for example in order to obtain drinking water or in order to obtain operating or cooling water. The present invention and the problem on which it is based will be explained below on the basis of such combined power plants for desalinating seawater without, however, restricting the invention to this application.

When required, combined power plants for the purpose of desalinating seawater can be operated such that either the generation of electrical energy or the generation of desalinated water is the priority aim, wherein the prioritization can here be influenced, for example, by the operation of the supplementary firing system, the steam extraction, and/or the quantity of the steam at the turbine.

WO 2012/072352 A1 describes a method for the operation and closed-loop control of a gas turbine. EP 3 022 611 B1 moreover describes a method for the computer-aided open-loop and closed-loop control of an energy generation plant.

The object of the present invention consists in improving the operation of a combined power plant, in particular enabling more flexible operation of a combined power plant. More efficient operation can thus be enabled by exploiting existing production flexibility.

According to the invention, at least one of these objects is achieved by a method as described herein and/or by a device as described herein and/or by a combined power plant as described herein.

Accordingly provided are:

A method for the computer-aided open-loop and/or closed-loop control of the operation of an energy generation system, in particular of a combined power plant for energy generation and seawater desalination, having the steps: building a simulation model of the energy generation system; providing an efficiency calculation module which is designed to calculate the expected thermal and electrical efficiency of the energy generation system on the basis of the built simulation model and using predetermined operating parameters; applying a learning and/or optimization method to the provided efficiency calculation module using previously obtained known operating data of the energy generation system and/or on the basis of simulation data obtained by the simulation model in such a way that the operation of the energy generation system is optimized in terms of at least one thermal and/or electrical operating parameter in accordance with a target value; building an open-loop control strategy for the energy generation system on the basis of the trained efficiency calculation module; and operating the energy generation system using the built open-loop control strategy.

A device for the computer-aided open-loop and/or closed-loop control of the operation of an energy generation system, in particular of the operation of a combined power plant for seawater desalination in order to simultaneously generate electricity and operate a desalination plant with steam, wherein the device has: a simulation device which is designed to build a simulation model of the energy generation system; an efficiency calculation module which is designed to calculate the expected thermal and electrical efficiency of the energy generation system on the basis of the built simulation model and using predetermined operating parameters of the energy generation system; an AI device which is designed to apply a learning and/or optimization method to the efficiency calculation module using known operating data and/or on the basis of simulation data in such a way that the operation of the energy generation system is optimized in terms of at least one thermal and/or electrical operating parameter; an open-loop control device which is designed to build an open-loop control strategy for the energy generation system on the basis of the trained efficiency calculation module and to operate the energy generation system using the built open-loop control strategy.

A combined power plant with a device for energy generation and with a device for computer-aided open-loop and/or closed-loop control of the operation of the combined power plant.

The idea on which the present invention is based consists in expanding the operation of an energy generation system such as, for example, a combined power plant for simultaneous energy generation energy and seawater desalination by either the generation of electrical energy, the generation of desalinated water, or a predetermined mixed operation mode being prioritized as required. The efficiency of the energy generation system is here calculated on the basis of a simulation model and from current, predicted, or simulated operating parameters. According to the invention, this operating efficiency is optimized on the basis of a learning and/or optimization method or "reinforcement learning control strategy" and using known operating data and simulation data which are used as training data. In this way, the energy generation system, in contrast to the case of known energy generation systems which are operated rather inflexibly, are operated flexibly on the basis of changing operating modes and/or conditions. By virtue of the learning and optimization method according to the invention, an open-loop control strategy can here be provided by means of which the combined power plant can be operated optimally in terms of a target value, also against the background of changing specifications or a changing demand for desalinated water and/or electrical energy.

The learning and optimization method according to the invention is based on one or more estimating functions which are based on models, for example thermodynamic or electrical simulation models, and the basic forms of which can be known or can be predetermined or estimated or approximated individually. In order to train the estimating function(s), the machine learning of the open-loop control device can be based on established, measured, or estimated operating data or on simulation data, for example approximation models, of the combined power plant and its components, wherein these data can reflect the current and/or past and/or future mode of operation of the combined power plant and its components.

The learning and optimization method according to the invention can furthermore be based on the exhaust products obtained under the mode of operation under consideration and on the associated variables of the combined power plant. The steam flow generated, which can be useable for further industrial use and/or desalination, and the electrical and thermal output generated and an efficiency of the power plant component(s) in this mode of operation and under the respective input variables (environmental parameters for power plant operation) can be a respective relevant parameter here.

The learning and optimization method according to the invention can furthermore contain a variable learning method for generating an open-loop control strategy. This open-loop control strategy can use the estimating function(s) trained from the machine learning as an input variable or variables in order to generate and influence a demand for electrical output and steam quantity, as well as efficiency and output, by the open-loop control of the operation of the power plant, wherein control and/or input parameters of the estimating function(s) can be set and controlled in the most efficient way possible. This most efficient way possible can correspond to generating output and/or reducing the consumption of fuel, for example gas, wherein predetermined requirements for output, current generation, etc can nevertheless be met.

The open-loop control strategy can be generated by means of the learning and optimization method according to the invention and the simulation model in order to obtain optimization of the operation of the power plant. By virtue of the optimization by means of the open-loop control strategy, operating modes of the operation of the power plant can be determined which meet a predetermined demand for electrical output and can deliver a steam flow or a steam quantity within a requested or required value range, wherein this value range can cover a currently needed steam demand. Such an open-loop control strategy can advantageously provide the most energy-efficient control settings for obtaining predetermined or requested current and/or steam quantities, wherein the estimating function(s) can for this purpose represent the corresponding efficiency values or efficiency parameters. These efficiency parameters or efficiency values can then be used by the optimization function of the open-loop control strategy in order to determine (or find) local operating modes which can correspond to as efficient as possible a mode of operation of the power plant, wherein various steam generation or steam transport conditions can be taken into consideration.

A surplus or a shortage of a quantity of desalinated water, relative to a comparison value of the operation, for example relative to average operation, can be obtained from the respective mode of operation. Depending on the surplus or shortage of desalinated water present in the collection tank of the desalination plant, an objective of the open-loop control strategy can be adapted to manage the open-loop control strategy, via the learning and optimization method, with respect to efficient generation parameters for current, heat, or water (steam). Input parameters and power plant operating parameters can thus be adapted to this objective in order to generate, for example, more or less steam at low pressure and to correspondingly increase or reduce the desalination of water, and advantageously thus to nevertheless meet the target value for power generation. Thus, for example, optimization can take place even when the operation of the power plant is at that time not in one of the possible and known optimized operating modes. When a present steam demand does not meet such a local optimal operating mode, the open-loop control strategy can detect this and take it into account and then vary for a certain period of time the guide values and target values of the electricity demand and/or steam demand, or the preset value thereof, in such a way that the latter corresponds to and/or meets a current electrical working point/working range (set value) or one which is to be obtained, combined with a reduced working point/working range (set value) for the steam generation, wherein the electrical working point/working range (set value) and/or working point/working range (set value) for the steam generation have or can generate a higher efficiency (in terms of the fuel consumption). After a certain period of time, the demand for steam can then rise and/or the working point/working range (set value) for the steam generation be elevated above an original working point/working range (set value) for the steam generation, i.e. the production can be raised above an original level. This new working point/working range (set value) for the steam generation can in turn have a higher efficiency of operation than the original operation of the power plant. In this way, the electricity demand can always be met, whilst the steam demand can on average be met over a certain time period.

As will be further explained below, a change can be made from an operating scenario with a simple request for electrical output and the generation of steam at low pressure to a further operating scenario. The further operating scenario can here have a slightly higher or lower production of steam at low pressure but with a higher efficiency of the operation of the power plant. In this way, a shortage or a surplus of water to be generated can be built up over a certain period of time, wherein operation with greater efficiency than originally provided can always take place over this certain period of time.

This varying of the steam production and production of water associated therewith can be performed by a buffering capacity of the desalination tank of the desalination plant when predetermined value ranges or limit ranges for existing or generated quantities of water can nevertheless be achieved or maintained.

Advantageous embodiments and developments can be found in the further dependent claims and in the description with reference to the Figures in the drawings.

According to a preferred embodiment, in the building method step, the simulation model is built on the basis of known consecutive states and properties of the energy generation system, in particular the thermal and/or electrical mode of operation, and the efficiency.

Many or all of the providing, applying, building, and/or operating method steps are particularly preferably performed iteratively, in particular after predetermined time intervals and/or predetermined operating events. In particular, in this way the simulation model and/or the efficiency calculation module can be continuously and/or iteratively aligned and/or trained with current operation of the energy generation system. In the case of a combined power plant, a certain amount of the steam generation and/or an electrical and thermal output generated can here be taken into account and compared with a preset value. In this way, efficiency of the operation of the power plant and its respective operating modes can advantageously be increased and adapted to preset values. This can correspond to a constantly or regularly repeated application of the gas-and-steam power plant optimization and/or the load point shifting, for example toward more efficient operating conditions whilst maintaining the minimum electrical output.

For example in the case of a combined power plant, the target value can contain, for example, a predetermined electrical output and/or a predetermined steam quantity. However, other operating parameters such as, for example, the steam pressure, the temperature, etc would be conceivable.

According to a preferred embodiment, the applying step comprises a training method for machine learning using an artificial intelligence (AI) device which comprises in particular a trainable artificial neural network and/or a deep learning unit. The learning (or training) is based, for example, on training data from known action sequences with known states, resulting from the action sequences, of the operation of the technical system.

According to a further or additional preferred embodiment, the applying step comprises an optimization method using one or more decision trees and/or based on a particle swarm optimization in order to determine an operating strategy. A predetermined electrical output and a predetermined steam flow can thus be generated for a predetermined operating strategy by optimization, wherein the efficiency can advantageously be increased by the optimization.

According to a preferred embodiment, the simulation model has a physical model, an analytical model, and/or a data-driven model for one or more components of the energy generation system.

According to a preferred embodiment, the energy generation system is a combined power plant for seawater desalination. In this case, the simulation model takes into account, for example, a power plant operating parameter and/or an environmental parameter. The estimation of the efficiency of the operation of the power plant can be increased and fixed in more detail by the choice of the corresponding power plant operating parameter and/or environmental parameter, which can effect an increase in the accuracy of the efficiency calculation.

A power plant operating parameter can here contain at least one of the following pieces of information about the combined power plant:
- mode of operation of a gas compressor;
- mode of operation of a gas preheater;
- mode of operation of a gas turbine;
- mode of operation of a heat recovery steam generator;
- mode of operation of a steam turbine;
- mode of operation of pump units;
- mode of operation of a desalination tank.

An environmental parameter can here contain at least one of the following pieces of information about the combined power plant:
- temperature of the ambient air;
- humidity of the ambient air;
- pressure of the ambient air;
- exhaust gas temperature;
- steam temperature;
- an HRSG supplementary firing;
- a steam flow of a gas turbine.

By means of the said parameters and power plant components, an evaluation model, for example for the efficiency calculation module and/or for the open-loop control strategy, can be built and used. Connected thereto or additionally from further approaches (for example, from known models for the mode of operation of the power plant components), models for electrical and/or thermal energy efficiency can be built and used which can take into account the operating modes of parts of or the whole operating cycle of the combined power plant. In the case of these operating modes, all the relevant power plant components and/or power plant operating parameters and/or environmental parameters can be taken into account.

The simulation models and the efficiency calculation modules for electrical and/or thermal energy efficiency can be checked for their present accuracy, it being possible for this to be a step of the machine or reinforcement learning. It can thus be estimated by how much the variables generated by the operation of the power plant (amount of current, electrical output, steam flow, steam quantity at high and low pressure, steam temperature, etc) deviate from a preset value or from an expected value. A degree of deviation can be determined therefrom, for example for the operating strategy and for its characteristic parameters. For example, when the degree of deviation is determined, a variation in the efficiency in the use of the fuel consumption for the power plant, such as for example natural gas, can be taken into account for the current operation and when changing to a different mode of operation. An optimized distribution of the output between different units or regions or the combined power plant can be effected as a result.

In addition or as an alternative to the abovementioned environmental parameters, further control parameters of the combined power plant and its components can also be taken into account, for example the exhaust gas temperature of a gas turbine, so-called "wet compression" as an output-increasing method, the steam temperature, supplementary firing parameters, attemporation or spraying of the high-pressure steam, extraction flow at the steam turbine, and the use of the HP/IP (high pressure to intermediate pressure) and HP/LP (high pressure to low pressure) reversing stations.

According to a preferred embodiment, the open-loop control strategy is modified by the above learning and/or optimization method in such a way that at least one optimized operating mode is determined in which a minimum value for the electrical output is generated and the generated steam flow is kept within a tolerance interval, wherein the tolerance interval meets a predetermined demand criterion. By means of the tolerance interval, there can then be a greater likelihood that more efficient operation can be found whilst observing the demand criteria and/or a preset value for at least one generated variable can be met.

According to a preferred embodiment, a check is made of the operating parameters during the operation of the combined power plant as to whether a steam flow presently generated in the combined power plant exceeds the steam flow predetermined by the operating strategy. In the case of a detected surplus, it can be provided that additional desalination takes place whilst maintaining the predetermined electrical output in order to at least partially compensate previous or expected operation of lower efficiency in the desalination. Operation with higher steam production can take place temporarily and then, to compensate, operation with lower steam production (or the other way round) when a higher efficiency can be achieved in both modes (or at least in total), as if the power plant is run (operated) over a certain period of time exactly according to a preset value.

According to a preferred embodiment, the operating strategy is scaled to future operating modes of the energy generation system. By virtue of the scalings, it is advantageously possible to react to expected changes in the operating or environmental conditions and relating to the future demand. For this purpose, the variation in the electrical demand (for example, the current or energy demand), the steam demand, the demand for desalinated water can be detected and, by scaling the guide values or target values, adapted for an electrical output and/or steam generation of the operation of the power plant in order to achieve a desired or required electrical output or steam generation with predetermined efficiency. It is, however, also or instead possible for an expected demand profile (for an electrical output and steam generation) in the case of steam generation as a whole (for steam; in contrast, for electrical output at any time) to be met as efficiently as possible.

The learning and optimization approach according to the invention can here correspond to a change from an operating scenario with a simple request for electrical output and steam generation at low pressure to a further operating scenario. The further operating scenario can here have a slightly higher or lower production of steam at low pressure but with a higher efficiency of the operation of the power plant. In this way, a shortage or surplus of water to be generated can be built up over a certain period of time, wherein operation can take place for this certain period of time with an increased efficiency than originally predetermined.

After a certain period of time or when a limit range is reached, for example when a permissible maximum level or minimum level of the water in the tank is reached, the operation can be changed to the respective other and more advantageous operating scenario or to a further operating scenario, wherein the further operating scenario can in turn also have a higher efficiency than the original demand, wherein however the further operating scenario does not allow the shortage/surplus to be consumed. In this way, a predetermined water quantity can be generated over a certain period of time and the predetermined electrical output thus always generated over this period of time, for example exactly the predetermined electrical output, and a higher efficiency always obtained than if an originally predetermined mode of operation had been followed.

Compared with known approaches, at least one of more simulation models and/or at least one or more efficiency calculation modules for building a suitable operating strategy can be used which directly controls the operation of the power plant. The operation can thus also be distributed over different blocks or regions of the power plant by the operating strategy. Control parameters for optimizing the operation of the power plant or subcomponents can here be used in order to enable, for example, optimization of the improved generation of electricity and steam with as little fuel as possible. Numerous environmental parameters can also be taken into account here, as a result of which degradation (ageing or the effects of wear) of power plant components can be taken into account. For example, a value range for an output of the operation of the power plant of +−10 MW and/or for a steam flow of +−10 kg/s can be taken into account for the operation, or it is possible to switch between them, or values which deviate therefrom can be considered.

The simulation models and/or efficiency calculation modules can be built or predetermined individually. The simulation models and/or efficiency calculation modules can be made accessible and trained online. The operation of the power plant can additionally be varied such that flexibility in the water and/or steam production can be created and this can be varied, wherein an efficiency of the operation of the power plant can be variable and at least the production of the electrical output can nevertheless meet a preset value.

The simulation models and/or efficiency calculation modules can be used in order to use the efficiency of one or more blocks of a combined power plant to determine a more sensitive distribution of the electrical output and steam output over different available blocks, in particular in the case of large combined power plants with a large number of power plant blocks. In this way, an improved operation of the power plant can be obtained which can be configured more effectively than previously customary offline operation with simulations of the operation of the power plant, which would have to be implemented in accordance with the simulation by established control curves of the operating variables. The optimization established according to the invention can take into account a significantly higher number of operating parameters and do so interactively and offline with the operation of the power plant.

According to a preferred embodiment of the combined power plant, the device for energy generation is designed to generate electrical energy and thermal energy for operating a desalination plant, and/or the combined power plant comprises a device for steam generation which is designed simultaneously to generate electrical energy and steam for the operation of a desalination plant.

The above embodiments and developments can, where appropriate, be combined with one another as desired. Further possible embodiments, developments, and implementations of the invention also comprise combinations, not explicitly mentioned, of features of the invention which are described above or below with respect to the exemplary embodiments. In particular, a person skilled in the art will here also add individual aspects as improvements or supplements to the respective basic form of the present invention.

The present invention will be explained in detail below on the basis of exemplary embodiments provided in the schematic Figures of the drawings, in which.

Figure 1:
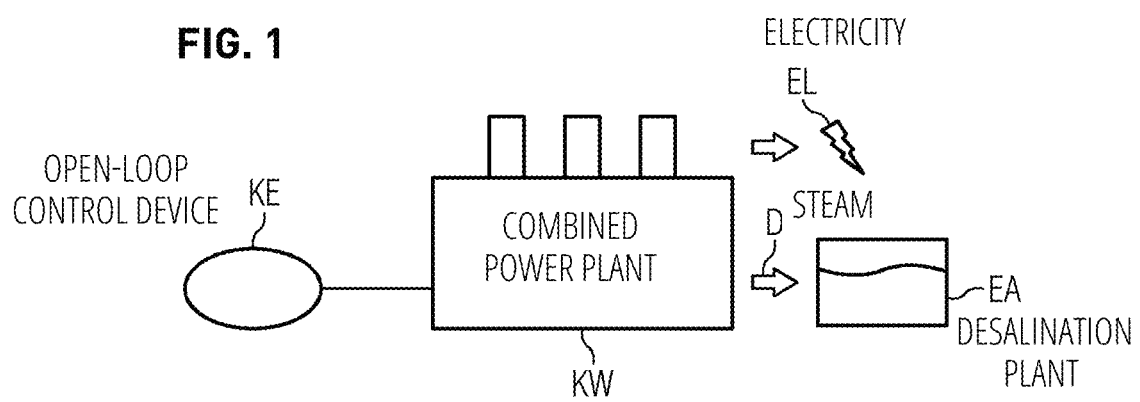
FIG. 1 shows a schematic illustration of an energy generation system, designed as a combined power plant, according to an exemplary embodiment of the present invention.

The attached drawings are intended to enable further understanding of the embodiments of the invention. They illustrate embodiments and serve, in conjunction with the description, to explain principles and concepts of the invention. Other embodiments and many of the said advantages become apparent with regard to the drawings. The elements of the drawings are not necessarily shown true to scale relative to one another.

Identical elements, features, and components and those which have the same function and the same effect are, unless stated otherwise, in each case provided in the Figures of the drawings with the same reference numerals.

FIG. 1 shows a schematic illustration of an energy generation system, designed as a combined power plant, according to an exemplary embodiment of the present invention.

The energy generation system according to the invention comprises an open-loop control device KE, a combined power plant KW, and a desalination plant EA.

The open-loop control device KE can here be coupled with a combined power plant KW via an open-loop control interface or be a constituent part of the combined power plant KW. The open-loop control device KE is designed according to the invention to perform a learning and/or optimization method, which relates to the open-loop control strategy for the combined power plant KW, in order to consequently generate a predetermined electrical output and a predetermined steam flow.

The open-loop control device KE for the purpose of the open-loop control of the operation of the combined power plant KW for generating electricity EL and for the purpose of operating a desalination plant EA with steam D is configured to determine at least one estimating function for the thermal and electrical mode of operation and efficiency of the combined power plant. The estimating function is trained, for example, via machine learning (or a different learning and optimization method) based on operating or measurement data and/or simulation data in order to build, on the basis of this estimating function, an open-loop control strategy for the optimized operation of the combined power plant by means of reinforcement learning with the application of the estimating function. This open-loop control strategy is applied for the operation of the combined power plant in order to generate an electrical output predetermined or prespecified by an operator of the combined power plant and/or a prespecified steam quantity for operating the desalination plant EA.

Figure 2:
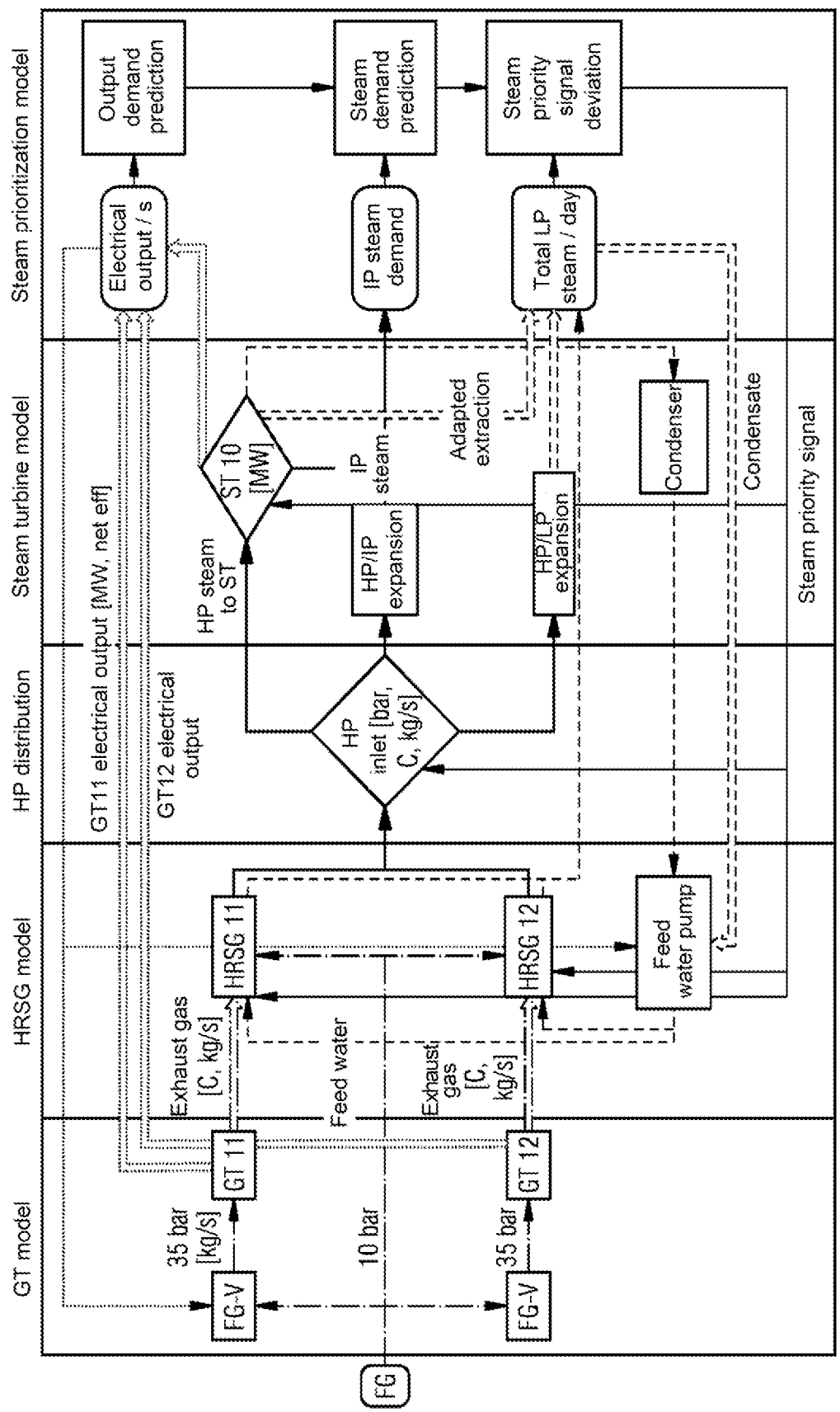
FIG. 2 shows a block diagram for the purpose of illustrating the functioning of the energy generation system from FIG. 1.

FIG. 2 shows a block diagram for the purpose of illustrating the functioning of the energy generation system from FIG. 1.

FIG. 2 shows a block diagram between an input of the fuel gas FG, for example at a pressure of 10 bar, and an output of the production products, in particular an electrical output and steam at low pressure LP, at high pressure HP, and at intermediate pressure IP. The efficiency of the operation of the power plant according to the invention can be established, relative to the required quantity of the fuel gas FG, from the generated variables for the electrical output and be optimized in order to obtain higher quantities of HP, IP, or LP steam for achievable preset values.

A first gas turbine GT11 and a second gas turbine GT12 can each be supplied with the fuel gas FG, for example after the latter has been compressed by a gas compressor FG-V, for example to a pressure of 35 bar. The operation of the gas turbines can be described with a known or independently provided gas turbine model (GT model), wherein corresponding operating data and operating parameters can be taken into account, for example in order to establish estimating functions. The surplus gas and/or the exhaust gas of the two gas turbines can in each case be passed to a first heat recovery steam generator HRSG11 and to a second heat recovery steam generator HRSG12. This section can be described with a model for the heat recovery steam generators (HRSG model).

The heat recovery steam generators can be operated with feed water from an associated pump and/or from a condenser in the power plant and generate steam at high pressure HP. A steam inlet (HP inlet) for the steam at high pressure can direct the steam to a steam turbine ST and to an expansion from high pressure HP to intermediate pressure IP and/or from high pressure HP to low pressure LP. The steam turbine ST can in turn generate a contribution to the electrical output, in addition to that from the gas turbines, or steam at intermediate pressure IP and/or at low pressure LP. A fraction of the steam output by the steam turbine ST can furthermore be directed to the condenser which in turn can generate feed water. A certain fraction can also condense directly from the output of the low pressure LP itself and then be recirculated back to the heat recovery steam generators.

The output products can then be compared with the demand for electrical output and steam at intermediate pressure, with a prediction for the demand for electrical output and with a prediction for the demand for steam, and a deviation can be calculated. A variation, to be adapted, in the variables of the operating parameters can then be generated therefrom and a prioritization signal for the electrical output and/or the steam can be established and be communicated to the heat recovery steam generators and/or turbines for the purpose of modifying the steam/current generation. To do this, in order to generate the steam at low pressure LP from the steam turbine ST, an adaptation of the extraction of the residual steam is controlled according to the deviation and prioritization values. For the operation of the steam turbine and in order to evaluate the products, a steam turbine model and a steam prioritization model can be applied in which corresponding system parameters for building corresponding estimating functions can be taken into account for the operation of these power plant modules.

Figure 3:
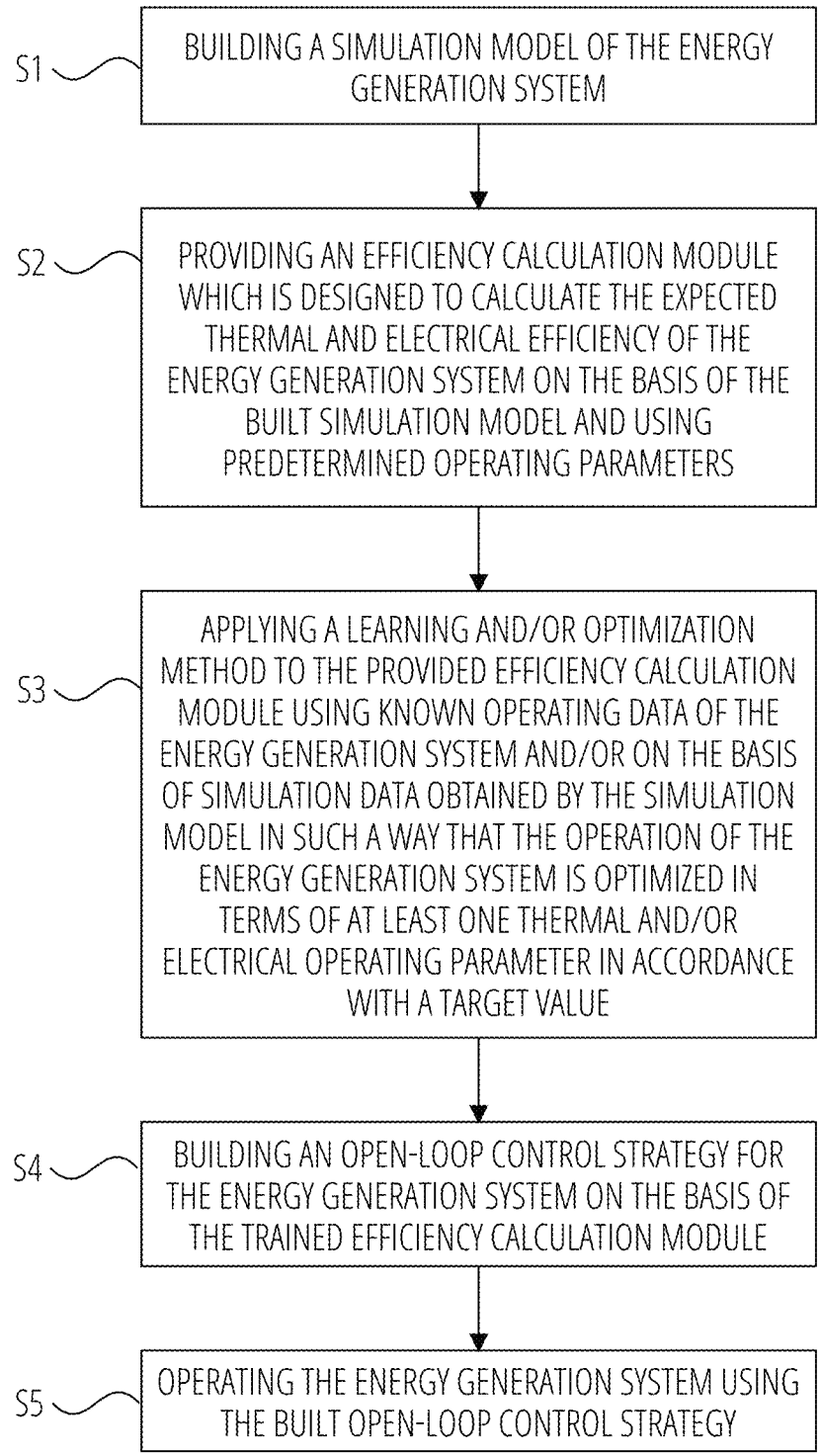
FIG. 3 shows a flow diagram for the method according to the invention for the computer-aided open-loop and/or closed-loop control of the operation of an energy generation system.

FIG. 3 shows a flow diagram for the method according to the invention for the computer-aided open-loop and/or closed-loop control of the operation of an energy generation system.

In the method according to the invention for the computer-aided open-loop and/or closed-loop control of the operation of an energy generation system, in an initial method step S1 a simulation model of the energy generation system, the combined power plant KW, or parts or components thereof is first built. This simulation model contains, depending on the complexity, a more or less precise copy of the energy generation system, the combined power plant KW, or parts or components thereof, and thus to a certain extent an estimating function with respect to their thermal and electrical mode of operation.

In a subsequent second method step S2, an efficiency calculation module is supplied. The efficiency calculation module is designed to calculate the expected thermal and electrical efficiency of the energy generation system on the basis of the built simulation model and using predetermined operating parameters.

In a following method step S3, training S2 of the efficiency calculation module takes place. This training step S3 takes place by applying a learning and/or optimization method to the supplied efficiency calculation module using known operating data of the energy generation system and/or on the basis of simulation data obtained by the simulation model. In this way, the operation of the energy generation system can be optimized in terms of at least one thermal and/or electrical operating parameter. The optimization preferably takes place on the basis of a target value, for example from the operator of the energy generation system, the combined power plant, and/or the plant for seawater desalination. Machine learning, for example using a trained artificial neural network (ANN), can preferably be considered for the learning and/or optimization method. However, any other artificial intelligence (AI) methods such as, for example, deep learning or reinforcement learning would be conceivable. Other learning and/or optimization methods such as, for example, the use of suitable decision trees, would, however, also be conceivable here.

In a further method step S4, an optimized open-loop control or operating strategy for operation of the energy generation system is established on the basis of the trained or optimized efficiency calculation module.

Lastly, the energy generation system or the combined power plant is operated in step S5 using the established optimized open-loop control or operating strategy. In this way, a prespecified output and/or a prespecified steam quantity for operating the desalination plant can be generated, adapted as required and individually.

Although the present invention has been fully described above on the basis of preferred exemplary embodiments, it is not limited thereto and instead can be modified in many different ways.

The invention claimed is:

1. A method for the computer-aided open-loop and/or closed-loop control of operation of an energy generation system comprising the steps:
    building (S1) a simulation model of the energy generation system, wherein the energy generation system includes a combined power plant for seawater desalination, wherein the simulation model takes into account power plant operating parameters;
    providing (S2) an efficiency calculation module, which is designed to calculate a thermal and electrical efficiency of the energy generation system on the basis of the built simulation model and using predetermined operating parameters, wherein the predetermined operating parameters include at least one operating mode of at least one component of the energy generation system
    applying (S3) a learning and/or optimization method to train the provided efficiency calculation module using:
    (a) known operating data of the energy generation system; and/or
    (b) simulation data obtained by the simulation model,
    in such a way that the operation of the energy generation system is optimized in terms of at least one thermal and/or electrical operating parameter in accordance with a target value, wherein the target value includes a predetermined electrical output;
    building (S4) an open-loop control strategy for the energy generation system based on the trained efficiency calculation module, such that at least one optimized operating mode is determined in which a minimum value for an electrical output is generated and a generated steam flow is kept within a steam flow tolerance interval; and
    operating (S5) the energy generation system using the built open-loop control strategy, wherein a check is made of operating parameters during the operation of the combined power plant as to whether a steam flow presently generated in the combined power plant indicates a detected surplus via exceeding the steam flow tolerance interval and, in the case of the detected surplus, additional desalination takes place whilst maintaining the predetermined electrical output.

2. The method as claimed in claim 1, wherein the applying step (S3) comprises an optimization method using one or more decision trees and/or based on a particle swarm optimization.

3. The method as claimed in claim 2, wherein in the building method step (S1), the simulation model is built on the basis of known consecutive states and properties of the energy generation system.

4. The method as claimed in claim 3, wherein the providing (S2), applying (S3), building (S4), and operating (S5) method steps are performed iteratively, in particular after predetermined time intervals and/or predetermined operating events.

5. The method as claimed in claim 4, wherein the target value contains a predetermined steam quantity.

6. The method as claimed in claim 5, wherein the applying step (S3) comprises a training method for machine learning using an artificial intelligence (AI) device, which AI device contains in particular a trainable artificial neural network and/or a deep learning unit.

7. The method as claimed in claim 6, wherein the simulation model has a physical model and/or an analytical model and/or a data-driven model for one or more components of the energy generation system.

8. The method as claimed in claim 1, wherein the simulation model takes into account an environmental parameter.

9. The method as claimed in claim 8, wherein the power plant operating parameter contains at least one of the following pieces of information about the combined power plant:
    mode of operation of a gas compressor;
    mode of operation of a gas preheater;
    mode of operation of a gas turbine (GT);
    mode of operation of a heat recovery steam generator (HRSG);
    mode of operation of a steam turbine (ST);
    mode of operation of pump units;
    mode of operation of a desalination tank or any combination thereof.

10. The method as claimed in claim 9, wherein the environmental parameter contains at least one of the following pieces of information about the combined power plant:
    temperature of the ambient air;
    humidity of the ambient air;
    pressure of the ambient air;
    exhaust gas temperature;
    steam temperature;
    an HRSG supplementary firing;
    a steam flow of a gas turbine (GT) tank or any combination thereof.

11. The method as claimed in claim 1, wherein the built open-loop control strategy is scaled to future operating modes of the energy generation system.

12. An energy generation system comprising a power plant including an open-loop control device that is configured to carry out the method of claim 1 to build an open-loop control strategy for the energy generation system on the basis of the trained efficiency calculation module and to operate the energy generation system using the built open-loop control strategy.

13. The energy generation system as claimed in claim 12, further comprising a desalination plant.

14. The energy generation system as claimed in claim 13, wherein the power plant is configured to generate electrical energy and thermal energy for operating the desalination plant, and/or the power plant is configured to simultaneously generate electrical energy and steam for the operation of the desalination plant.

* * * * *